United States Patent [19]
Neri et al.

[11] Patent Number: 5,155,153
[45] Date of Patent: Oct. 13, 1992

[54] STABILIZING COMPOSITION FOR ORGANIC POLYMERS

[75] Inventors: Carlo Neri, Milan; Roberto Podesta, Savona; Giovanni Sandre, Milan, all of Italy

[73] Assignee: Enichem Synthesis S.p.A., Palermo, Italy

[21] Appl. No.: 766,961

[22] Filed: Sep. 25, 1991

Related U.S. Application Data

[63] Continuation of Ser. No. 530,160, May 29, 1990, abandoned, which is a continuation of Ser. No. 308,323, Feb. 9, 1989, abandoned.

[30] Foreign Application Priority Data

Feb. 24, 1988 [IL] Israel ................................ 19508

[51] Int. Cl.⁵ .............................................. C08K 5/256
[52] U.S. Cl. .................................... 524/101; 524/151; 524/153; 524/291; 524/303; 524/304; 524/342; 252/400.24
[58] Field of Search ............... 524/101, 151, 153, 303, 524/304, 291, 342; 252/400.24

[56] References Cited

U.S. PATENT DOCUMENTS

| | | | |
|---|---|---|---|
| 3,409,587 | 11/1968 | Mills .................................. | 524/304 |
| 3,531,483 | 9/1970 | Gilles . | |
| 3,558,554 | 1/1971 | Kuriyama et al. ................... | 524/147 |
| 3,644,482 | 2/1972 | Dexter et al. . | |
| 3,702,837 | 11/1972 | Gilles . | |
| 4,187,212 | 2/1980 | Zinke et al. .......................... | 524/101 |

FOREIGN PATENT DOCUMENTS

| | | |
|---|---|---|
| 227948 | 7/1987 | European Pat. Off. . |
| 42-8689 | 4/1967 | Japan . |
| 43-15685 | 7/1968 | Japan . |
| 46-32861 | 9/1971 | Japan . |
| 56-152864 | 11/1981 | Japan . |
| 58-142924 | 8/1983 | Japan . |
| 1078772 | 8/1967 | United Kingdom . |
| 1490938 | 11/1977 | United Kingdom . |

OTHER PUBLICATIONS

F. Mitterhofer, "Processing Stability", Polymer Enp. & Sci., Mid Jul. 1980, vol. 20, pp. 692-695.

George K. Cowell-Plastics Engineering, pp. 51-57 (Oct. 1976).

Henman, "Meet Stabilization of Polypropylene", *Developments in Polymer Stabilization*-1, pp. 39, 77 to 83, 92 to 95 (1979).

*Primary Examiner*—Veronica P. Hoke
*Attorney, Agent, or Firm*—Hedman, Gibson & Costigan

[57] ABSTRACT

A stabilizing composition for thermoplastic organic polymers containing measured quantities of: (a) a sterically hindered phenol; (b) a triarylphosphite; and (c) a dialkylthiodipropionate. Stabilized polymer compositions are also described containing a thermoplastic organic polymer, in particular a polyolefin, and a stabilizing quantity of said stabilizing composition, which possess excellent characteristics in relation to their melt flow index and color when subjected to repeated extrusion and in relation to their long-term thermal stability.

11 Claims, No Drawings

STABILIZING COMPOSITION FOR ORGANIC POLYMERS

This is a continuation of application Ser. No. 530,160 filed May 29, 1990, now abandoned which is in turn a continuation of application Ser. No. 308,323, filed Feb. 9, 1989, now abandoned.

This invention relates to a stabilizing composition for thermoplastic organic polymers.

The invention also relates to stabilized polymer compositions containing a thermoplastic organic polymer and a stabilizing quantity of said stabilizing composition.

Organic polymers are known to be subject to deterioration by light, heat and oxidative action, with consequent coloration, surface cracking and loss of mechanical characteristics. To oppose such deterioration it is also known to add to the organic polymers stabilizing substances such as sterically hindered phenolic compounds, organic phosphorus compounds, substituted aromatic amines and organic compounds containing sulphur.

It has also been proposed in the art to use several stabilizing substances in mutual combination to obtain particular effects. For example, U.S. Pat. No. 3,558,554 describes polyolefinic compounds stabilized with a stabilizing system containing an organic phosphite, 1,1,1-tri(2-methyl-4-hydroxy-5-tert-butylphenyl)butane and dilauryl thiodipropionate. A characteristic of this stabilizing system is the relatively high dilauryl thiodipropionate content, the weight ratio of this to the phenol being of the order of 4:1. These polymer compositions suffer essentially from the drawback of poor colour characteristics.

Again, according to "Developments in Polymer Stabilisation-6", Ed. G. Scott, Applied Science Publishers, 1989, pages 34 and 35, dialkylthiodipropionates are effective in stabilizing polyolefins when used in combination with small quantities of phenolic antioxidants.

U.S. Pat. No. 4,187,212 describes polymer compositions stabilized with a stabilizing system containing a triarylphosphite and a sterically hindered antioxidant phenol. According to this patent the presence of a compound such as dilauryl thiodipropionate in the stabilizing system is undesirable because it imparts poor colour characteristics to the thus stabilized polymer compositions. The present invention is based on the unexpected discovery that when small quantities of a dialkylthiodipropionate are associated with particular antioxidant phenols and with particular organic phosphites it is possible to obtain a stabilizing system able to improve the colour characteristics of the thermoplastic organic polymers in which the stabilizing system is incorporated while at the same time maintaining the melt flow index and long-term thermal stability index at optimum levels.

In accordance therewith, according to a first aspect the present invention provides a stabilizing composition for thermoplastic organic polymers, said composition being characterised by containing:

a) a sterically hindered antioxidant phenol chosen from:
pentaerythritol-tetra[3-(3,5-di-tert-butyl-4-hydroxyphenyl) propionate]; n-octadecyl ester of β-(3,5-di-tert-butyl-4-hydroxyphenyl) propionic acid;
1,3,5-tris(3',5'-di-tert-butyl-4-hydroxybenzyl)isocyanurate;
1,3,5-tris(3,5-di-tert-butyl-4-hydroxybenzyl)-2,4,6-trimethylbenzene;
ethyleneglycol-bis(3,3-bis-3'-tert-butyl-4'-hydroxyphenyl) butyrate; and
hexamethylene-1,6-di[3-(3,5-di-tert-butyl-4-hydroxyphenyl) propionate];

b) a triarylphosphite of general formula:

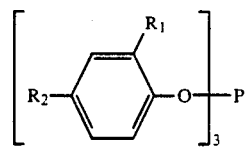

where:
$R_1$ represents the tert-butyl or 1,1-dimethylpropyl group; and
$R_2$ represents the methyl, tert-butyl or 1,1-dimethyl propyl group; and c) a dialkylthiodipropionate containing from 10 to 20 carbon atoms in each alkyl portion;
wherein the weight ratio [(b)+(c)]/(a) varies from 50:50 to 80:20, a ratio of (a) (b) of 1:1 to 1:2 and the weight ratio (b)/(c) varies from 99:1 to 90:10.

In the preferred embodiment of the present invention:
component (a) is chosen from pentaerythritol-tetra[3-(3,5-di-tert-butyl-4-hydroxy-phenyl)propionate] and n-octadecyl ester of β-(3,5-di-tert-butyl-4-hydroxyphenyl)propionic acid;
component (b) is tris(2,4-di-tert-butyl-phenyl)phosphite; and
component (c) is chosen from dilauryl thiodipropionate, distearyl thiodipropionate and dimyristyl thiodipropionate.

In the stabilizing compositions of the present invention the ratio of constituent (b) to constituent (c) is particularly critical. In this respect, if said ratio exceeds 99:1, appreciable effects deriving from the presence of the dialkylthiodipropionate do not appear in the stabilized polymer composition, whereas if the ratio is less than 90:10 undesirable colour phenomena being to appear. The best results are obtained when the weight ratio of constituent (b) to constituent (c) is kept within the range of 98:2 to 95:5. By operating with the constituents (a), (b) and (c) within the aforesaid ranges stabilized thermoplastic organic polymers compositions can be obtained having optimum melt flow index, colour (evaluated on compositions subjected to repeated extrusion) and long-term stability values.

Consequently, according to a further aspect, the invention provides a stabilized polymer composition containing a thermoplastic organic polymer and a stabilizing quantity of the aforedefined stabilizing composition. The term "stabilizing quantity" is intended to signify that the stabilizing composition is present in the stabilized polymer composition in a quantity within the range of 0.01 to 5.0% by weight and preferably 0.02 to 0.5% by weight.

The organic polymers which can be stabilized are thermoplastics in general and preferably olefinic polymers, by which are meant high and low density polyethylene, low density linear polyethylene, polypropylene and copolymers or terpolymers of ethylene with alpha-olefins containing three or more carbon atoms.

The polymer compositions according to the present invention can also contain one or more additives chosen from substituted aromatic amines; visible or ultraviolet light stabilizers; metal deactivators; basic co-stabilizers; and nucleating agents.

The polymer compositions according to the present invention can be prepared in accordance with normal known methods by mixing and homogenizing the thermoplastic organic polymer with the stabilizing composition.

The following experimental examples are given to further illustrate the invention.

Specifically, in these examples measurements are made of the melt-flow index of compositions containing an organic polymer and the stabilizing composition which are subjected to repeated extrusion. In addition, moulded plates are prepared from granules of the extruded polymer composition and are used to determine the yellow index (YI).

EXAMPLE 1

In this example the commerical polypropylene FLF 20 of the Hymont Company is used. This polymer, in granular form, is mixed with the stabilizing composition and the homogeneous mixture obtained is subjected to repeated extrusion in a Brabender extruder of diameter 19 mm and length about 25 times the diameter, and provided with a screw and 2 mm nozzle, using a compression ratio of 1:4 and a temperature profile of 190° C.; 235° C.; 270° C.; 270° C. The extruder is driven at 50 r.p.m. and the filament leaving the extruder is cut into granules. A fraction of the granules obtained after the first, third, fifth and seventh extrusions is examined for melt-flow index (MFI) in accordance with ASTM D 1238 operating at 230° C. and a load of 2.16 kg. A further fraction of the granules is compressed at 190° C. to obtain plates of 1.5 mm thickness by operating for three minutes at 4 kg/cm$^2$ and three minutes at 130 kg/cm$^2$ and then cooling the resultant plates in water at ambient temperature. Yellow index (YI) measurements are carried out on these plates in accordance with ASTM D 1925.

In this example the components of the stabilizing composition are:
a) pentaerythritol-tetra[3-(3,5-di-tert-butyl-4-hydroxyphenyl) propionate];
b) tris(2,4-di-tert-butyl-phenyl)phosphite; and
c) distearyl thiodipropionate.

In this example a stabilizing composition is used in which the weight ratio of component (a) to component (b) is 1:1 and the quantity of component (c) is varied.

Table 1 shows the individual components of stabilizing compositions used in the polymer composition and the MFI and YI values of the polymer composition after the number of extrusions indicated therein. Tests 1 and 2 of said table are comparison tests.

EXAMPLE 2

The procedure of Example 1 is followed but with a 1:2 weight ratio of component (a) to component (b) in the stabilizing composition, the quantity of component (c) being varied. The results are given in Table 2, in which tests 1 and 2 are comparison tests.

EXAMPLE 3

The procedure of Example 1 is followed but using commercial high density polyethylene 3.002 of the Solvay Company. In this case the temperature profile in the extruder is as follows: 200° C.; 220° C.; 240° C.; 260° C. The extruder is driven at 100 r.p.m., the MFI is evaluated at 190° C. and the plates are compressed at 175° C. The weight ratio of component (a) to component (b) in the stabilizing composition is kept constant at 1:1, whereas the quantity of component (c) is varied. The results are given in Table 3, in which tests 1 and 2 are comparison tests.

EXAMPLE 4

The procedure of Example 3 is followed but with a 1:2 weight ratio of component (a) to component (b) in the stabilizing composition, the quantity of component (c) being varied. The results are given in Table 4, in which tests 1 and 2 are comparison tests.

EXAMPLE 5

The procedure of Example 1 is followed but using compositions containing the following components:
a) pentaerythritol-tetra[3-(3,5-di-tert-butyl-4-hydroxyphenyl) propionate];
a') n-octadecyl ester of $\beta$-(3,5-di-tert-butyl-4-hydroxyphenyl) propionic acid;
b) tris(2,4-di-tert-butyl-phenyl)phosphite; and
c) distearyl thiodipropionate.

The high-density organic polymer additionally used is SG5013 P high density polyethylene of Enichem Anic. In this case the temperature profile in the extruder is 200° C.; 220° C.; 240° C.; 260° C. and the extruder is driven at 100 r.p.m. The MFI is evaluated at 230° C. and the plates are compressed at 175° C.

The results are given in Table 5, in which tests 1, 2, 4 and 6 are comparison tests.

EXAMPLE 6

The procedure of Example 5 is followed but using a low density linear polyethylene provided by the Dow Chemical Company. The results are given in Table 6, in which tests 1, 2, 4 and 6 are comparison tests.

EXAMPLE 7

The procedure of Example 1 is followed using the stabilizing composition and stabilized polymer indicated therein. However in the stabilizing composition the quantities of component (c) used are large and are outside the range given for the present invention. The results of these tests are given in Table 7.

TABLE 1

| TEST No. | STABILIZING COMPOUND | M.F.I.: EXTRUSION | | | | YI: EXTRUSION | | | |
|---|---|---|---|---|---|---|---|---|---|
| | | 1 | 3 | 5 | 7 | 1 | 3 | 5 | 7 |
| 1 | No stabilizer | 15.13 | 21.65 | 28.64 | 36.15 | 4.11 | 5.12 | 5.21 | 5.73 |
| 2 | (a) 0.005 wt % (b) 0.005 wt % | 13.70 | 16.11 | 18.33 | 20.75 | 3.13 | 4.56 | 5.81 | 6.97 |
| 3 | (a) 0.005 wt % (b) 0.005 wt % (c) 1 wt % of (b) | 13.36 | 15.45 | 17.76 | 19.97 | 2.85 | 3.70 | 4.60 | 5.75 |
| 4 | (a) 0.005 wt % (b) 0.005 wt % | | | | | | | | |

TABLE 1-continued

| TEST No. | STABILIZING COMPOUND | M.F.I.: EXTRUSION | | | | YI: EXTRUSION | | | |
|---|---|---|---|---|---|---|---|---|---|
| | | 1 | 3 | 5 | 7 | 1 | 3 | 5 | 7 |
| | (c) 3 wt % of (b) | 13.09 | 15.70 | 18.39 | 20.54 | 2.60 | 3.15 | 3.55 | 4.98 |

TABLE 2

| TEST No. | STABILIZING COMPOUND | M.F.I.: EXTRUSION | | | | YI: EXTRUSION | | | |
|---|---|---|---|---|---|---|---|---|---|
| | | 1 | 3 | 5 | 7 | 1 | 3 | 5 | 7 |
| 1 | No stabilizer | 15.13 | 21.65 | 28.64 | 36.15 | 4.11 | 5.12 | 5.21 | 5.73 |
| 2 | (a) 0.033 wt % (b) 0.066 wt % | 13.66 | 15.82 | 18.62 | 20.33 | 3.09 | 4.60 | 5.97 | 7.32 |
| 3 | (a) 0.033 wt % (b) 0.066 wt % (c) 1 wt % of (b) | 13.99 | 16.30 | 18.80 | 20.99 | 2.65 | 3.49 | 4.10 | 4.75 |
| 4 | (a) 0.033 wt % (b) 0.066 wt % (c) 3 wt % of (b) | 12.72 | 15.10 | 17.56 | 19.90 | 2.39 | 3.12 | 3.58 | 4.20 |

TABLE 3

| TEST No. | STABILIZING COMPOUND | M.F.I.: EXTRUSION | | | | YI: EXTRUSION | | | |
|---|---|---|---|---|---|---|---|---|---|
| | | 1 | 3 | 5 | 7 | 1 | 3 | 5 | 7 |
| 1 | No stabilizer | 17.13 | 16.02 | 14.94 | 13.89 | −0.76 | −0.36 | −0.06 | 0.07 |
| 2 | (a) 0.025 wt % (b) 0.025 wt % | 16.78 | 16.70 | 16.62 | 16.53 | −0.31 | 2.74 | 4.89 | 6.33 |
| 3 | (a) 0.025 wt % (b) 0.025 wt % (c) 1 wt % of (b) | 17.64 | 17.72 | 17.23 | 16.98 | −0.59 | 1.97 | 3.14 | 3.95 |
| 4 | (a) 0.025 wt % (b) 0.025 wt % (c) 5 wt % of (b) | 17.68 | 17.56 | 17.23 | 16.84 | −0.62 | 1.45 | 2.94 | 3.75 |
| 5 | (a) 0.025 wt % (b) 0.025 wt % (c) 10 wt % of (b) | 17.34 | 17.09 | 16.80 | 16.50 | −0.56 | 1.29 | 2.47 | 2.90 |

TABLE 4

| TEST No. | STABILIZING COMPOUND | M.F.I.: EXTRUSION | | | | YI: EXTRUSION | | | |
|---|---|---|---|---|---|---|---|---|---|
| | | 1 | 3 | 5 | 7 | 1 | 3 | 5 | 7 |
| 1 | No stabilizer | 17.13 | 16.02 | 14.94 | 13.89 | −0.76 | −0.36 | −0.06 | 0.07 |
| 2 | (a) 0.016 wt % (b) 0.033 wt % | 17.15 | 17.03 | 16.90 | 16.80 | −0.29 | 2.51 | 3.93 | 4.94 |
| 3 | (a) 0.016 wt % (b) 0.033 wt % (c) 1 wt % of (b) | 17.50 | 17.41 | 17.38 | 16.88 | −1.19 | 0.63 | 2.04 | 2.82 |
| 4 | (a) 0.016 wt % (b) 0.033 wt % (c) 5 wt % of (b) | 17.91 | 17.60 | 17.30 | 16.91 | −0.89 | 1.19 | 2.45 | 3.52 |
| 5 | (a) 0.016 wt % (b) 0.033 wt % (c) 10 wt % of (b) | 17.75 | 17.35 | 17.01 | 16.85 | −0.31 | 1.60 | 2.23 | 2.61 |

TABLE 5

| TEST No. | STABILIZING COMPOUND | M.F.I.: EXTRUSION | | | | YI: EXTRUSION | | | |
|---|---|---|---|---|---|---|---|---|---|
| | | 1 | 3 | 5 | 7 | 1 | 3 | 5 | 7 |
| 1 | No stabilizer | 10.02 | 9.14 | 7.88 | 6.79 | −0.07 | 2.28 | 2.90 | 2.95 |
| 2 | (a) 0.083 wt % (b) 0.166 wt % | 7.26 | 7.28 | 7.31 | 7.34 | 2.09 | 3.25 | 5.22 | 7.12 |
| 3 | (a) 0.083 wt % (b) 0.166 wt % (c) 1 wt % of (b) | 7.37 | 7.25 | 7.33 | 7.38 | −0.16 | 1.07 | 2.19 | 3.12 |
| 4 | (a) 0.125 wt % (b) 0.125 wt % | 7.34 | 7.32 | 7.30 | 7.28 | −0.42 | 0.32 | 0.87 | 2.25 |
| 5 | (a) 0.125 wt % (b) 0.125 wt % (c) 1 wt % of (b) | 7.20 | 7.35 | 7.28 | 7.30 | −0.15 | 0.07 | 0.85 | 1.15 |
| 6 | (a') 0.05 wt % (b) 0.2 wt % | 7.96 | 7.69 | 7.43 | 7.25 | 1.83 | 2.10 | 2.81 | 3.53 |
| 7 | (a') 0.05 wt % (b) 0.2 wt % (c) 1 wt % of (b) | 7.19 | 7.29 | 7.38 | 7.45 | −0.93 | 0.33 | 1.16 | 1.99 |

TABLE 6

| TEST No. | STABILIZING COMPOUND | M.F.I.: EXTRUSION | | | | YI: EXTRUSION | | | |
|---|---|---|---|---|---|---|---|---|---|
| | | 1 | 3 | 5 | 7 | 1 | 3 | 5 | 7 |
| 1 | No stabilizer | 1.70 | 1.37 | 1.12 | 0.95 | 10.45 | 17.30 | 18.46 | 20.66 |
| 2 | (a) 0.05 wt % (b) 0.1 wt % | 2.44 | 2.36 | 2.28 | 2.18 | 9.30 | 15.12 | 18.27 | 19.60 |
| 3 | (a) 0.05 wt % (b) 0.1 wt % (c) 1 wt % of (b) | 2.44 | 2.38 | 2.21 | 2.15 | 9.27 | 13.49 | 15.28 | 16.92 |
| 4 | (a) 0.075 wt % (b) 0.075 wt % | 2.85 | 2.73 | 2.69 | 2.65 | 8.82 | 14.50 | 17.85 | 20.06 |
| 5 | (a) 0.075 wt % (b) 0.075 wt % (c) 1 wt % of (b) | 2.46 | 2.43 | 2.28 | 2.12 | 9.52 | 13.65 | 17.12 | 18.46 |
| 6 | (a') 0.03 wt % (b) 0.12 wt % | 2.55 | 2.51 | 2.46 | 2.42 | 8.85 | 13.84 | 15.96 | 18.06 |
| 7 | (a') 0.03 wt % (b) 0.12 wt % (c) 1 wt % of (b) | 2.53 | 2.44 | 2.35 | 2.26 | 8.88 | 12.13 | 14.84 | 16.84 |

TABLE 7

| TEST No. | STABILIZING COMPOUND | M.F.I.: EXTRUSION | | | | YI: EXTRUSION | | | |
|---|---|---|---|---|---|---|---|---|---|
| | | 1 | 3 | 5 | 7 | 1 | 3 | 5 | 7 |
| 1 | No stabilizer | 15.13 | 21.65 | 28.64 | 36.15 | 4.11 | 5.12 | 5.21 | 5.73 |
| 2 | (a) 0.05 wt % (b) 0.1 wt % | 13.30 | 15.23 | 16.80 | 18.75 | 2.70 | 3.65 | 4.85 | 5.85 |
| 3 | (a) 0.05 wt % (b) 0.1 wt % (c) 20 wt % of (b) | 13.61 | 16.11 | 18.16 | 19.97 | 2.68 | 3.68 | 4.59 | 5.81 |
| 4 | (a) 0.05 wt % (b) 0.1 wt % (c) 50 wt % of (b) | 13.52 | 15.98 | 18.16 | 20.07 | 2.50 | 3.33 | 4.10 | 4.92 |
| 5 | (a) 0.05 wt % (b) 0.1 wt % (c) 100 wt % of (b) | 13.90 | 16.20 | 18.50 | 20.60 | 2.49 | 3.29 | 4.04 | 4.87 |

We claim:

1. A stabilizing composition for thermoplastic polyolefin polymers, comprising:
   a) a sterically hindered antioxidant phenol chosen from:
   pentaerythritol-tetra(3-(3,5-di-tert-butyl-4-hydroxy-phenyl) propionate); n-octadecyl ester of β-(3,5-di-tert-butyl-4-hydroxyphenyl) propionic acid;
   1,3,5-tris(3',5'-di-tert-butyl-4-hydroxybenzyl)isocyanurate;
   1,3,5-tris(3,5-di-tert-butyl-4-hydroxybenzyl)-2,4,6-trimethylbenzene;
   ethyleneglycol-bis(3,3-bis-3'-tert-butyl-4'-hydroxyphenyl)butyrate; and
   hexamethylene-1,6-di(3-(3,5-di-tert-butyl-4-hydroxyphenyl)propionate;
   b) a triarylphosphite of general formula:

$$\left[ R_2 - \underset{R_1}{\underset{|}{\bigcirc}} - O \right]_3 P$$

where:
   $R_1$ represents the tert-butyl or 1,1-dimethylpropyl group; and
   $R_2$ represents the methyl, tert-butyl or 1,1-dimethyl propyl group; and
   c) a dialkylthiodipropionate containing from 10 to 20 carbon atoms in each alkyl portion;
   wherein the weight ratio ((b)+(c))/(a) varies from about 50:50 to 80:20, the weight ratio (b)/(c) varies from about 99:1 to 95:5, and the weight ratio (a)/(b) is about 1:1 to 1:2.

2. A composition as defined in claim 1, wherein the weight ratio of (b)/(c) varies from about 98:2 to 95:5.

3. A composition as defined in claim 2, wherein the sterically hindered antioxidant phenol is pentaerythritol-tetra(3-(3,5-di-tert-butyl-4-hydroxyphenyl)propionate).

4. A composition as defined in claim 2, wherein the sterically hindered antioxidant phenol is n-octadecyl ester of β-(3,5-di-tert-butyl-4-hydroxyphenyl) propionic acid.

5. A composition as defined in claim 2, wherein the sterically hindered antioxidant phenol is 1,3,5-tris(3',5'-di-tert-butyl-4-hydroxybenzyl)isocyanuarate.

6. A composition as defined in claim 2, wherein the sterically hindered antioxidant is 1,3,5-tris(3,5-di-tert-butyl-4-hydroxybenzyl)trimethylbenzene.

7. A composition as defined in claim 2, wherein the sterically hindered antioxidant phenol is ethyleneglycol-bis(3,3-bis-3'-tert-buty-4'-hydroxyphenyl)butyrate.

8. A composition as defined in claim 2, wherein the sterically hindered antioxidant phenol is hexamethylene-1,1-di(3-5-di-tert-butyl-4-hydroxyphenyl)propionate.

9. A polymer composition which consists essentially of a thermoplastic organic polymer and from 0.01–5.0% by weight of the stabilizing composition of claim 1.

10. A polymer composition as defined in claim 9, wherein the polymer is polypropylene.

11. A polymer composition as defined in claim 10, wherein the polymer is polyethylene.

* * * * *

UNITED STATES PATENT AND TRADEMARK OFFICE
CERTIFICATE OF CORRECTION

PATENT NO.  : 5,155,153
DATED       : October 13, 1992
INVENTOR(S) : Neri et al.

It is certified that error appears in the above-identified patent and that said Letters Patent is hereby corrected as shown below:

On the title page, item [30], Foreign Application Priority Data; "Israel" should read --Italy--

Signed and Sealed this

Twenty-sixth Day of October, 1993

Attest:

BRUCE LEHMAN

*Attesting Officer*    *Commissioner of Patents and Trademarks*